US012770923B2

(12) United States Patent
Cho et al.

(10) Patent No.: US 12,770,923 B2
(45) Date of Patent: Oct. 20, 2026

(54) ELECTROLYTE SOLUTION FOR LITHIUM SECONDARY BATTERY AND LITHIUM SECONDARY BATTERY INCLUDING THE SAME

(71) Applicants: SK ON CO., LTD., Seoul (KR); SK INNOVATION CO., LTD., Seoul (KR)

(72) Inventors: In Haeng Cho, Daejeon (KR); Yu Na Shim, Daejeon (KR); Moon Sung Kim, Daejeon (KR); Sung Jin Kim, Daejeon (KR); Soo Min Park, Daejeon (KR); Min Young Lee, Daejeon (KR); Jin Hong Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 707 days.

(21) Appl. No.: 18/094,762

(22) Filed: Jan. 9, 2023

(65) Prior Publication Data

US 2023/0231194 A1 Jul. 20, 2023

(30) Foreign Application Priority Data

Jan. 14, 2022 (KR) ........................ 10-2022-0005585

(51) Int. Cl.

| | |
|---|---|
| ***H01M 10/0567*** | (2010.01) |
| ***C07F 9/06*** | (2006.01) |
| ***H01M 10/052*** | (2010.01) |
| ***H01M 10/0569*** | (2010.01) |
| ***H01M 10/0585*** | (2010.01) |

(52) U.S. Cl.

CPC ........... *H01M 10/0567* (2013.01); *C07F 9/06* (2013.01); *H01M 10/052* (2013.01); *H01M 10/0569* (2013.01); *H01M 10/0585* (2013.01); *H01M 2300/004* (2013.01)

(58) Field of Classification Search

CPC ......... H01M 10/0525; H01M 10/0567; H01M 10/0585; H01M 2300/004

See application file for complete search history.

(56) References Cited

U.S. PATENT DOCUMENTS

| | | | | |
|---|---|---|---|---|
| 2019/0379086 | A1 * | 12/2019 | Yoo | H01M 4/366 |
| 2020/0388883 | A1 * | 12/2020 | Cho | H01M 4/525 |

FOREIGN PATENT DOCUMENTS

| | | | |
|---|---|---|---|
| EP | 3787090 | A1 | 3/2021 |
| KR | 10-2019-0010318 | A | 1/2019 |
| KR | 10-2019-0119615 | A | 10/2019 |
| KR | 10-2094263 | B1 | 3/2020 |
| KR | 10-2020-0041135 | A | 4/2020 |
| KR | 10-2020-0068309 | A | 6/2020 |

OTHER PUBLICATIONS

Extended European Search Report for the European Patent Application No. 23150762.5 issued by the European Patent Office on Sep. 13, 2023.

* cited by examiner

*Primary Examiner* — Osei K Amponsah

(74) *Attorney, Agent, or Firm* — IP&T GROUP LLP

(57) ABSTRACT

An electrolyte solution for a lithium secondary battery includes an organic solvent, a lithium salt, and a fluorine-based additive in which a terminal difluoro-phosphite group (—$OPF_2$) is bonded to a branched saturated hydrocarbon group. The fluorine-based additive prevent side reactions in the electrolyte solution to improve stability of a cathode active material.

9 Claims, 1 Drawing Sheet

ELECTROLYTE SOLUTION FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

This application claims priority to Korean Patent Applications No. 10-2022-0005585 filed on Jan. 14, 2022 in the Korean Intellectual Property Office (KIPO), the entire disclosure of which is incorporated by reference herein.

BACKGROUND

1. Field

The present invention relates to an electrolyte solution and a lithium secondary battery including the same. More particularly, the present invention relates to an electrolyte solution including a solvent and an electrolytic salt, and a lithium secondary battery including the same.

2. Description of the Related Art

A secondary battery which can be charged and discharged repeatedly has been widely employed as a power source of a mobile electronic device such as a camcorder, a mobile phone, a laptop computer. Recently, a battery pack including the secondary battery is being developed and applied as a power source of an eco-friendly automobile such as a hybrid vehicle.

A lithium secondary battery is highlighted and developed among various types of secondary batteries due to high operational voltage and energy density per unit weight, a high charging rate, a compact dimension, etc.

For example, the lithium secondary battery may include an electrode assembly including a cathode, an anode and a separation layer (separator), and an electrolyte solution immersing the electrode assembly. The lithium secondary battery may further include an outer case having, e.g., a pouch shape for accommodating the electrode assembly and the electrolyte solution.

As an application range of the lithium secondary batteries is expanded, enhanced life-span, and higher capacity and operational stability are required. Accordingly, a lithium secondary battery that provides uniform power and capacity even during repeated charging and discharging is preferable.

However, power and capacity may be decreased due to surface damages of a nickel-based lithium metal oxide used as the cathode active material, and side reactions between the nickel-based lithium metal oxide and the electrolyte may occur. Further, stability of the battery may be deteriorated in harsh conditions at high temperature or low temperature.

For example, as disclosed in Korean Published Patent Application No. 10-2019-0119615, etc., a method for improving battery properties by adding additives to a non-aqueous electrolyte for a lithium secondary battery is being researched.

SUMMARY

According to an aspect of the present invention, there is provided an electrolyte solution providing improved mechanical and chemical stability.

According to an aspect of the present invention, there is provided a lithium secondary battery including the electrolyte solution and having improved operational stability and electrical property.

An electrolyte solution for a lithium secondar battery includes an organic solvent, a lithium salt, and a fluorine-based additive in which a terminal difluoro-phosphite group ($-OPF_2$) is bonded to a branched saturated hydrocarbon group.

In some embodiments, the fluorine-based additive may include a compound represented by Chemical Formula 1 or Chemical Formula 2 below.

[Chemical Formula 1]

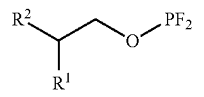

[Chemical Formula 2]

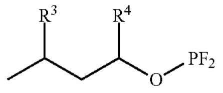

In Chemical Formulae 1 and 2, $R^1$, $R^2$, $R^3$ and $R^4$ are each independently a C1-C10 alkyl group.

In some embodiments, $R^1$ in Chemical Formula 1 may be a C4-C10 alkyl group, and $R^2$, $R^3$ and $R^4$ may each independently be a C1-C3 alkyl group.

In some embodiments, the fluorine-based additive may include a compound represented by Chemical Formula 1-1 or Chemical Formula 2-1.

[Chemical Formula 1-1]

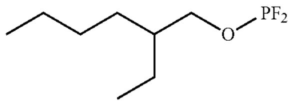

[Chemical Formula 2-1]

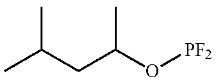

In some embodiments, the fluorine-based additive may be included in an amount ranging from 0.1 wt % to 5.0 wt % based on a total weight of the electrolyte solution.

In some embodiments, the fluorine-based additive may be included in an amount ranging from 0.5 wt % to 2.0 wt % based on a total weight of the electrolyte solution.

In some embodiments, the electrolyte solution may further include at least one auxiliary additive selected from the group consisting of a cyclic carbonate-based compound, a fluorine-substituted cyclic carbonate-based compounds, a sultone-based compound and a cyclic sulfate-based compound.

In some embodiments, the auxiliary additive may be included in an amount ranging from 0.01 wt % to 5 wt % based on a total weight of the electrolyte solution.

In some embodiments, the organic solvent may include at least one selected from the group consisting of ethylene carbonate (EC), ethyl methyl carbonate (EMC), dimethyl carbonate (DMC) and diethyl carbonate (DEC).

A lithium secondary battery includes an electrode assembly including a plurality of cathodes and anodes that are repeatedly stacked, a case accommodating the electrode assembly, and the electrolyte solution for a lithium secondary battery according to the above-described embodiments accommodated in the case together with the electrode assembly.

The electrolyte solution for a lithium secondary battery according to embodiments of the present invention includes fluorine-based additive having a terminal difluoro-phosphite (—$OPF_2$) group, and the fluorine-based additive may protect the cathode active material by an interaction with a surface of the cathode active material.

In exemplary embodiments, the fluorine-based additive has a branched saturated hydrocarbon structure, and thus may have a high boiling point and may form a stable protective film on the surface of the cathode active material.

For example, a double bond may be formed in the fluorine-based additive during charging/discharging at a high temperature. Accordingly, the formation of the protective film may be promoted and generation of gas at high temperature may be effectively suppressed.

Modification of the cathode active material can be prevented by using the fluorine-based additive even at a low temperature of, e.g., −10° C. or less, and a stable capacity retention rate may be obtained.

DETAILED DESCRIPTION OF THE EMBODIMENTS

Figure 1:
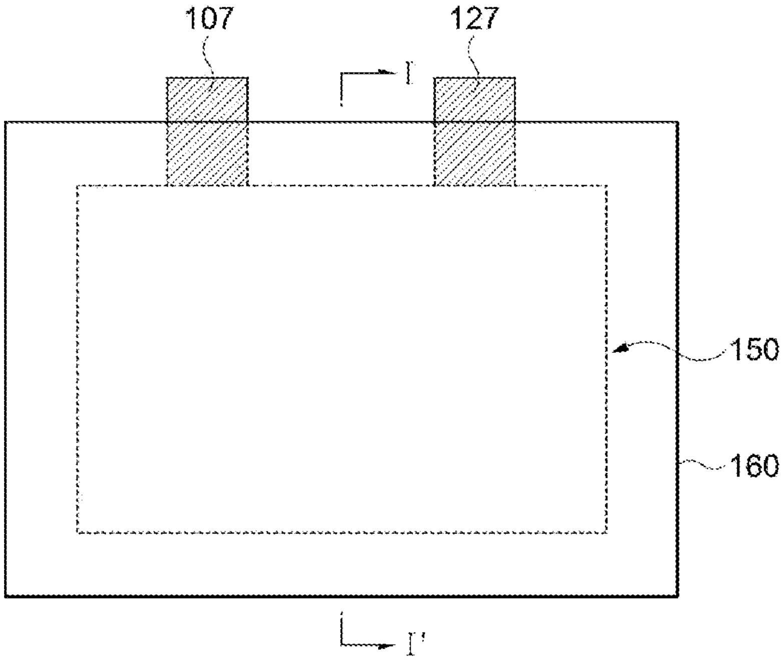
FIGS. 1 and 2 are a schematic plan view and a schematic cross-sectional view, respectively, illustrating a lithium secondary battery in accordance with exemplary embodiments.

According to embodiments of the present invention, an electrolyte solution for a lithium secondary battery including a fluorine-based additive is provided. Further, a lithium secondary battery including the electrolyte solution and having improved electrical, mechanical and chemical stability is also provided.

<Electrolyte Solution for Lithium Secondary Battery>

An electrolyte solution for a lithium secondary battery according to embodiments of the present invention (hereinafter, that may be abbreviated as an electrolyte solution) includes an organic solvent, an electrolyte (e.g., a lithium salt), and a fluorine-based additive.

The organic solvent may include an organic compound that provides sufficient solubility for the lithium salt and the fluorine-based additive and has no substantial reactivity with the lithium secondary battery. In some embodiments, a non-aqueous organic solvent may be used, and the electrolyte solution may be provided as a non-aqueous electrolyte solution.

In example embodiments, the organic solvent may include a carbonate-based solvent, an carboxylic acid ester-based solvent, an ether-based solvent, a ketone-based solvent, an alcohol-based solvent, an aprotic solvent, etc. These may be used alone or in a combination thereof.

For example, the carbonate-based solvent may include dimethyl carbonate (DMC), ethyl methyl carbonate (EMC), methyl propyl carbonate, ethyl propyl carbonate, diethyl carbonate (DEC), dipropyl carbonate, propylene carbonate (PC), ethylene carbonate (EC), fluoroethylene carbonate (FEC), butylene carbonate, etc.

For example, the carboxylic acid ester-based solvent may include methyl acetate (MA), ethyl acetate (EA), n-propyl acetate (n-PA), 1,1-dimethylethyl acetate (DMEA), methyl propionate (MP), ethyl propionate (EP), γ-butyrolactone (GBL), decanolide, valerolactone, mevalonolactone, caprolactone, etc.

For example, the ether-based solvent may include dibutyl ether, tetraethylene glycol dimethyl ether (TEGDME), diethylene glycol dimethyl ether (DEGDME), dimethoxyethane, tetrahydrofuran (THF), 2-methyltetrahydrofuran, etc.

For example, the ketone-based solvent may include cyclohexanone, etc. For example, the alcohol-based solvent may include ethyl alcohol, isopropyl alcohol, etc.

For example, the aprotic solvent may include a nitrile-based solvent, an amide-based solvent such as dimethylformamide (DMF), a dioxolane-based solvent such as 1,3-dioxolane, a sulfolane-based solvent, etc.

In a preferable embodiment, the organic solvent may include the carbonate-based solvent, and the carbonate-based solvent may include ethylene carbonate (EC), ethylmethyl carbonate (EMC), dimethyl carbonate (DMC), diethyl carbonate (DEC), or a combination therefrom. In an embodiment, a combination of at least two of ethylene carbonate (EC), ethyl methyl carbonate (EMC), dimethyl carbonate (DMC) and diethyl carbonate (DEC) may be used as the organic solvent.

The electrolyte may include, e.g., a lithium salt. For example, the lithium salt may be expressed as $Li^+X^-$. Non-limiting examples of the anion $X^-$ may include $F^-$, $Cl^-$, $Br^-$, $I^-$, $NO_3^-$, $N(CN)_2^-$, $BF_4^-$, $ClO_4^-$, $PF_6^-$, $SbF_6^-$, $AsF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3$, $CF_3CF_2SO_3$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2$, $CH_3CO_2$, $SCN^-$, $(CF_3CF_2SO_2)_2N^-$, etc. These may be used alone or in a combination thereof.

In some embodiments, the lithium salt may include $LiBF_4$ and/or $LiPF_6$.

In an embodiment, the lithium salt may be included in a concentration from about 0.01 M to 5M, preferably from about 0.01 M to 2M, more preferably from 0.1 M to 1.5 M with respect to the organic solvent. Within the above range, transfer of lithium ions and/or electrons may be promoted during charging and discharging of the lithium secondary battery, so that improved capacity may be achieved.

In exemplary embodiments, the fluorine-based additive may include a compound having a difluoro-phosphite group (—$OPF_2$) bonded to a terminal thereof. In exemplary embodiments, the terminal difluoro-phosphite group of the fluorine-based additive may be connected to a branched saturated hydrocarbon group (e.g., a branched alkyl group).

In some embodiments, the fluorine-based additive may include a compound represented by Chemical Formula 1 or Chemical Formula 2 below.

[Chemical Formula 1]

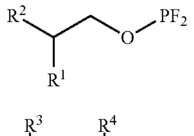

[Chemical Formula 2]

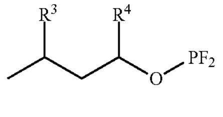

In Chemical Formulae 1 and 2, $R^1$, $R^2$, $R^3$ and $R^4$ may each independently be a C1-C10 alkyl group.

In some embodiments, $R^1$ in Chemical Formula 1 may be a C4-C10 alkyl group, and $R^2$, $R^3$ and $R^4$ may each independently be a C1-C3 alkyl group. Within the carbon number range, structural stability may be enhanced by maintaining an appropriate chain length, and deterioration of activity of the cathode active material due to an excessive increase of a branch length or a main chain length may be prevented.

In exemplary embodiments, the fluorine-based additive may include a compound represented by Chemical Formula 1-1 or Chemical Formula 2-1 below.

[Chemical Formula 1-1]

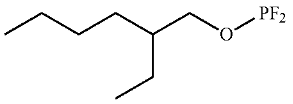

[Chemical Formula 2-1]

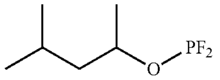

The difluoro-phosphite group included in the fluorine-based additive may be exposed at the terminal thereof. Thus, possibility that the difluoro-phosphite group freely contacts the cathode active material to form a coordination bond may be increased. Accordingly, a cathode electrolyte interphase (CEI) layer may be formed at an interface of the cathode active material and the electrolyte solution, so that a surface of the cathode active material or a cathode surface may be protected.

Further, the difluoro-phosphite group may be bonded to the branched saturated hydrocarbon group, so that the fluorine-based additive may have a relatively high boiling point and may stably form the protective film at high temperature. Additionally, the number of contact branches or contact bridges with the cathode active material may be increased by the branched structure, so that the protective film may be formed more rapidly and easily.

For example, the fluorine-based additive may have the branched alkyl group structure, and thus a double bond may be formed in a carbon chain of the fluorine-based additive during charging/discharging at high temperature. Thus, after the fluorine-based additive contacts with the cathode active material, the formation of the protective film may be more promoted. Further, as a relatively electron-rich double bond is generated, an additional interaction or bond with a transition metal of the cathode active material may be generated Accordingly, passivation and surface stabilization effects of the cathode active material may be amplified, and thus high-temperature stability and life-span stability of the lithium secondary electricity may be remarkably improved.

As described above, a gas generation due to a side reaction caused by elution of transition metal ions from the cathode active material may be suppressed by the protective film formed from the fluorine-based additive during repeated charge/discharge cycles. Therefore, a capacity retention of the secondary battery may be stably obtained even at high temperature.

For example, the protective film may be stably maintained by a molecular structure converted into the double bond as described above in the fluorine-based additive at a low temperature of −10° C. or less. Thus, the stable capacity retention may be provided even at the low temperature without deterioration of activity due to the protective film.

In some embodiments, a content of the fluorine-based additive in a total weight of the electrolyte solution may be less than about 10 weight percent (wt %) and may be greater than or equal to about 0.1 wt %.

For example, in consideration of implementing sufficient passivation and stabilization effects, the content of the fluorine-based additive may be 0.1 wt % or more, 0.2 wt % or more, 0.3 wt % or more, 0.4 wt % or more, 0.5 wt % or more, or 1 wt % or more. Further, in consideration of a lithium ion mobility and an active material activity in the electrolyte solution, the content of the fluorine-based additive may be 9 wt % or less, 7 wt % or less, 6 wt % or less, 5 wt % or less, 4.5 wt % or less, 4 wt % or less, 3.5 wt % or less, 3 wt % or less, or 2 wt % or less.

In a preferable embodiment, the content of the fluorine-based additive may be in a range from 0.1 wt % to 5 wt %, more preferably from 0.5 wt % to 2 wt %. Within the above range, the above-described passivation and surface stabilization effects of the cathode active material may be sufficiently implemented, and movement of lithium ions and activity of the cathode active material may not be excessively inhibited.

In some embodiments, the electrolyte solution may further include an auxiliary additive. For example, the auxiliary additive may include a cyclic carbonate-based compound including a double bond, a fluorine-substituted cyclic carbonate-based compound, a sultone-based compound, a cyclic sulfate-based compound, etc.

The cyclic carbonate-based compound including the double bond may include vinylene carbonate (VC), vinyl ethylene carbonate (VEC), etc.

The fluorine-substituted cyclic carbonate-based compound may include fluoroethylene carbonate (FEC).

The sultone-based compound includes 1,3-propane sultone, 1,3-propene sultone, 1,4-butane sultone, etc.

The cyclic sulfate-based compound may include 1,2-ethylene sulfate, 1,2-propylene sulfate, etc.

In a preferable embodiment, the fluorine-substituted cyclic carbonate-based compound and the cyclic carbonate-based compound may be used together as the auxiliary additive. In this case, the stability and durability of the protective film may be further enhanced. In an embodiment, the sultone-based compound may be used together with the fluorine-substituted cyclic carbonate-based compound and the cyclic carbonate-based compound.

The aforementioned auxiliary additive may further enhance durability and stability of the protective film formed by the fluorine-based additive. The auxiliary additive may be included in an appropriate amount within a range that may not inhibit the passivation effect of the above-described fluorine-based additive and the movement of lithium ions in the electrolyte solution.

For example, a content of the auxiliary additive may be 5 wt % or less, 4 wt % or less, 3 wt % or less, 2.5 wt % or less, 2 wt % or less, or 1 wt % or less based on the total weight of the electrolyte solution in consideration of the activity of the fluorine-based additive. Further, the content of the auxiliary additive may be 0.01 wt % or more, 0.02 wt % or more, 0.03 wt % or more, 0.05 wt % or more, 0.1 wt % or more, 0.2 wt % or more, 0.3 wt % or more, 0.4 wt % or more or 0.5 wt % or more in consideration of the stabilization of the protective film.

In some embodiments, the auxiliary additive may be included in an amount ranging from 0.01 wt % to 5 wt %, preferably 0.05 wt % to 5 wt %, more preferably 0.1 wt % to 4 wt %, based on the total weight of the non-aqueous electrolyte solution. Within the above range, the durability of the protective film may be enhanced without inhibiting the film formation of the fluorine-based additive.

The organic solvent in the electrolyte solution may be used in a residual amount or in a remainder amount excluding the above-mentioned components.

<Lithium Secondary Battery>

According to embodiments of the present invention, a lithium secondary battery including the above-described electrolyte solution is provided.

Figure 2:
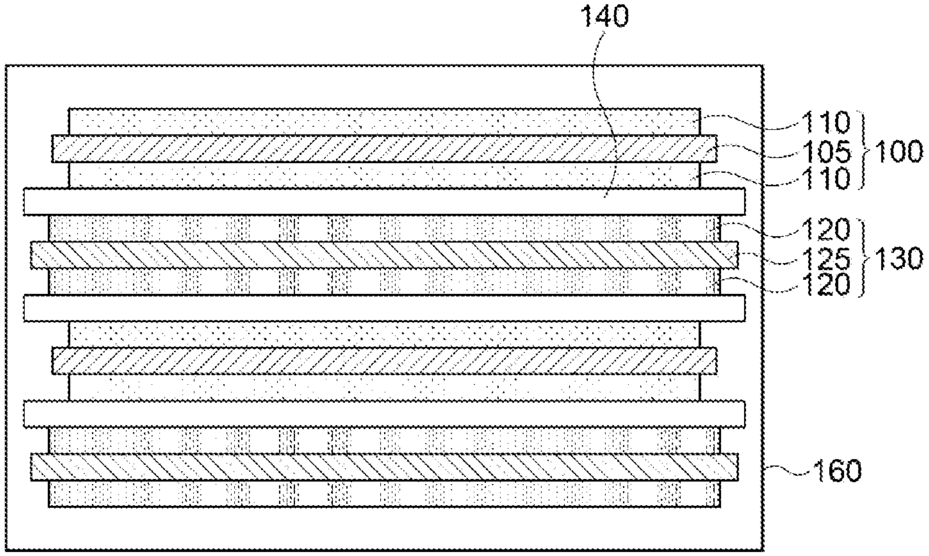

FIGS. 1 and 2 are a schematic plan view and a schematic cross-sectional view, respectively, illustrating a lithium secondary battery in accordance with exemplary embodiments.

Referring to FIGS. 1 and 2, a lithium secondary battery may include an electrode assembly including a cathode 100, an anode 130, and a separation layer 140 interposed between the cathode and the anode.

The electrode assembly may be accommodated together with the electrolyte solution in a case 160 and impregnated with the electrolyte.

The cathode 100 may include a cathode active material layer 110 formed by coating a cathode active material on a cathode current collector 105. The cathode active material may include a compound capable of reversibly intercalating and de-intercalating lithium ions.

In exemplary embodiments, the cathode active material may include a lithium-transition metal oxide. For example, the lithium-transition metal oxide includes nickel (Ni) and may further include at least one of cobalt (Co) and manganese (Mn).

For example, the lithium-transition metal oxide may be represented by Formula 1 below.

$$Li_{1+a}Ni_{1-(x+y)}CO_xM_yO_2 \qquad \text{[Formula 1]}$$

In Formula 1, $-0.05 \le a \le 0.2$, $0.01 \le x \le 0.3$, $0.01 \le y \le 0.3$, and M may include at least one element selected from Mn, Mg, Sr, Ba, B, Al, Si, Ti, Zr and W.

As shown in Formula 1, the lithium-transition metal compound may include Ni in the largest content or molar ratio among Ni, Co and M. Ni may substantially serve as a metal related to power and/or capacity of the lithium secondary battery. Ni may be included in the largest amount among transition metals, so that a high-capacity and high-power lithium secondary battery may be implemented.

In an embodiment, in Formula 1, $0.01 \le x \le 0.2$ and $0.01 \le y \le 0.2$. In an embodiment, the molar ratio of Ni may be 0.7 or more, or 0.8 or more.

When the content of Ni in the cathode active material or the lithium-transition metal oxide is increased, chemical stability, high-temperature storage stability, etc., of the secondary battery may be relatively deteriorated. Additionally, surface damages of the cathode active material or a side reaction with the electrolyte may be caused during repeated charge/discharge cycles, and sufficient high power/high capacity properties from to the high Ni content may not be obtained.

However, as described above, the fluorine-based additive may be combined with Ni on the surface of the cathode active material or the lithium-transition metal oxide through a coordinate bond or a chemical interaction to provide the passivation of the cathode active material. Thus, the high power/high capacity properties through the high Ni content may be substantially uniformly maintained for a long period even in a high temperature environment.

For example, a cathode slurry may be prepared by mixing and stirring the cathode active material in a solvent with a cathode binder, a conductive material and/or a dispersive agent, etc. The cathode slurry may be coated on the cathode current collector 105, and then dried and pressed to form the cathode 100.

The cathode current collector 105 may include stainless-steel, nickel, aluminum, titanium, copper or an alloy thereof. Preferably, aluminum or an alloy thereof may be used.

For example, the binder may include an organic based binder such as polyvinylidenefluoride (PVDF), a polyvinylidene fluoride-hexafluoropropylene copolymer (PVDF-co-HFP), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as the cathode binder. In this case, an amount of the binder for forming the cathode active material layer may be reduced, and an amount of the cathode active material may be relatively increased. Thus, capacity and power of the lithium secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The anode 130 may include an anode current collector 125 and an anode active material layer 120 formed by coating an anode active material on the anode current collector 125.

The anode active material may include a widely known material in the related art which may be capable of adsorbing and ejecting lithium ions. For example, the anode active material may include a carbon-based material such as a crystalline carbon, an amorphous carbon, a carbon complex, a carbon fiber, etc., a lithium alloy, a silicon-based material, tin, etc.

The amorphous carbon may include, e.g., a hard carbon, cokes, a mesocarbon microbead (MCMB), a mesophase pitch-based carbon fiber (MPCF), etc. The crystalline carbon may include, e.g., an artificial graphite, natural graphite, graphitized cokes, graphitized MCMB, graphitized MPCF, etc.

For example, the lithium alloy may include a metal element such as aluminum, zinc, bismuth, cadmium, antimony, silicon, lead, tin, gallium, indium, etc.

The silicon-based compound may include, e.g., silicon, silicon oxide, a silicon-carbon composite compound such as silicon carbide (SiC).

For example, the anode active material may be mixed and stirred together with the above-described binder and conductive material, a thickener, etc., in a solvent to form a slurry. The slurry may be coated on at least one surface of the anode current collector 125, dried and pressed to obtain the anode 130.

A separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without a loss by, e.g., precipitation or sedimentation.

In exemplary embodiments, an electrode cell may be defined by the cathode 100, the anode 130 and the separation layer 140, and a plurality of the electrode cells may be stacked to form the electrode assembly 150 that may have e.g., a jelly roll shape. For example, the electrode assembly 150 may be formed by winding, laminating or folding the separation layer 140.

The electrode assembly 150 may be accommodated together with the electrolyte solution according to exemplary embodiments in the case 160 to define the lithium secondary battery.

As illustrated in FIG. 1, electrode tabs (a cathode tab and an anode tab) may protrude from the cathode current collector 105 and the anode current collector 125 included in each electrode cell to one side of the case 160. The electrode tabs may be welded together with the one side of the case 160 to be connected to an electrode lead (a cathode lead 107 and an anode lead 127) that may be extended or exposed to an outside of the case 160.

The lithium secondary battery may be fabricated into a cylindrical shape using a can, a prismatic shape, a pouch shape, a coin shape, etc.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Synthesis of Fluorine-Based Additive

(1) Synthesis Example 1 (Synthesis of Chemical Formula 1-1)

Preparation of 2-ethyl-1-hexyldifluorophosphite i) Preparation of 2-ethyl-1-hexyldichlorophosphite

Heptane (180 mL) and trichlorophosphine ($PCl_3$) (31.7 mL, 0.36 mol) were added to a 500 mL round-bottom flask under a nitrogen atmosphere, stirred for 10 minutes, and then cooled to around 0° C. After slowly adding 2-ethyl-1-hexanol (45 g, 0.35 mol) dropwise to the reaction solution over 3 hours, the mixture was stirred for 1 hour while raising a temperature to room temperature.

The reaction mixture was vacuumed to remove volatile materials and a final product 2-ethyl-1-hexyldichlorophosphite (54 g, 0.23 mol) was obtained in ayield of 67.6% ($^1$H NMR (500 MHz, $CDCl_3$) δ 0.91 (t, 6H), 1.30 (m, 6H), 1.38 (m, 2H), 1.59 (m, 1H), 4.15 (m, 2H) ppm).

ii) Preparation of 2-ethyl-1-hexyldifluorophosphite

Antimony trifluoride ($SbF_3$) (28 g, 0.16 mol) was added to a 100 mL round-bottom flask under a nitrogen atmosphere. After cooling to around 0° C., 2-ethyl-1-hexyldichlorophosphite (54 g, 0.23 mol) prepared in i) was slowly added to prevent heat generation, compound damages and yield reduction of the final product, etc., due to a rapid reaction.

After reacting at room temperature for 2 hours, purification was performed by distillation under reduced pressure. The final product, 2-ethyl-1-hexyldifluorophosphite (12.7 g, 0.064 mol) was obtained in 30% yield ($^1$H NMR (500 MHz, $CDCl_3$) δ 0.89 (t, 6H), 1.28 (m, 6H)), 1.38 (m, 2H), 1.52 (m, 1H), 3.98 (m, 2H) ppm).

(2) Synthesis Example 2 (Synthesis of Chemical Formula 2-1)

i) Preparation of 4-methyl-2-pentyldichlorophosphite

Hexane (180 mL) and trichlorophosphine ($PCl_3$) (40.4 mL, 0.46 mol) were added to a 500 mL round-bottom flask under a nitrogen atmosphere, stirred for 10 minutes, and then cooled to around 0° C.

After slowly adding 4-methyl-2-pentanol (45 g, 0.44 mol) dropwise to the reaction solution over 3 hours, the mixture was stirred for 1 hour while raising a temperature to room temperature. The reaction mixture was vacuumed to remove volatile materials, and 4-methyl-2-pentyldichlorophosphite (77.3 g, 0.38 mol) was obtained with a yield of 86% ($^1$H NMR (500 MHz, $CDCl_3$) δ 0.94 (d, 6H), 1.4 (d, 4H), 1.63-1.68 (m, 2H), 4.92 (m, 1H) ppm).

ii) Preparation of 4-methyl-2-pentyldifluorophosphite

Antimony trifluoride ($SbF_3$) (26.5 g, 0.15 mol) was added to a 100 mL round-bottom flask under a nitrogen atmosphere. After cooling to around 0° C., 4-methyl-2-pentyldichlorophosphite (50 g, 0.25 mol) prepared in i) was slowly added to prevent heat generation, compound damages and yield reduction of the final product, etc., due to a rapid reaction.

After reacting at room temperature for 2 hours, purification was performed by distillation under reduced pressure to obtain 4-methyl-2-pentyldifluorophosphite (29.1 g, 0.17 mol) as a final product with a yield of 69% ($^1$H NMR (500 MHz, $CDCl_3$) δ 0.91 (d, 6H), 1.27 (m, 1H), 1.31 (d, 3H), 1.58 (m, 1H), 1.68 (m, 1H), 4.74 (m, 1H) ppm).

(3) Synthesis Example 3 (Synthesis of Chemical Formula 3)

Preparation of Pentyldifluorophosphite (Chemical Formula 3)

[Chemical Formula 3]

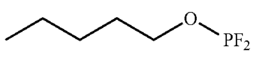

i) Preparation of Pentyldichlorophosphite

Heptane (200 mL) and trichlorophosphine ($PCl_3$) (56 mL, 0.57 mol) were added to a 500 mL round-bottom flask under a nitrogen atmosphere, stirred for 10 minutes, and then cooled to around 0° C. After slowly adding 1-pentanol (50 g, 0.57 mol) dropwise to the reaction solution over 3 hours, the mixture was stirred for 1 hour while raising a temperature to room temperature.

The reaction mixture was vacuumed to remove volatile materials, and pentyldichlorophosphite (75 g, 0.40 mol) was obtained with a yield of 70% ($^1$H NMR (500 MHz, $C_6D_6$) δ 0.94 (m, 3H), 1.00-1.40 (m, 6H), 3.80 (m, 2H) ppm)

ii) Preparation of Pentyldifluorophosphite

Antimony trifluoride ($SbF_3$) (20 g, 0.11 mol) was added to a 100 mL round-bottom flask under a nitrogen atmosphere. After cooling to around 0° C., pentyldichlorophosphite (30 g, 0.16 mol) prepared in i) was slowly added to prevent heat generation, compound damages and yield reduction of the final product, etc., due to a rapid reaction.

After sufficiently reacting at room temperature for 2 hours or more, purification was performed through distillation under reduced pressure to obtain the final product, pentyldifluorophosphite (12 g, 0.077 mol) with 48% yield ($^1$H NMR (500 MHz, $C_6D_6$) δ 0.74 (m, 3H), 1.00-1.20 (m, 4H), 1.30 (m, 2H), 3.67 (q, 2H) ppm).

EXAMPLES AND COMPARATIVE EXAMPLES

Example 1

(1) Preparation of Electrolyte Solution

A 1.0 M $LiPF_6$ solution (EC/EMC/DEC mixed solvent in a 25:45:30 volume ratio) was prepared. 1 wt % of fluoroethylene carbonate (FEC), 0.3 wt % of vinylethylene carbonate (VEC), 0.5 wt % of 1,3-propane sultone (PS) and 0.5 wt % of 1,3-propensultone (PRS) was added in the $LiPF_6$ solution, and 1 wt % of the compound represented by Chemical Formula 1-1 was mixed as a fluorine-based additive, based on a total weight of the electrolyte solution, (2) Preparation of Lithium Secondary Battery Sample A cathode active material in which $Li[Ni_{0.6}Co_{0.2}Mn_{0.2}]O_2$ and $Li[Ni_{0.8}Co_{0.1}Mn_{0.1}]O_2$ were mixed in a weight ratio of 6:4, carbon black as a conductive material, and polyvinylidene fluoride (PVdF) as a binder were mixed in a weight ratio of 92:5:3 to prepare a slurry. The slurry was uniformly coated on an aluminum foil having a thickness of 15 μm, vacuum dried and pressed at 130° C. to prepare a cathode for a lithium secondary battery.

95 wt % of an anode active material including artificial graphite and natural graphite in a weight ratio of 7:3, 1 wt % of Super-P as a conductive material, 2 wt % of styrene-butadiene rubber (SBR) as a binder, and 2 wt % of carboxymethyl cellulose (CMC) as a thickener was mixed to prepare an anode slurry. The anode slurry was uniformly coated on a copper foil having a thickness of 15 μm, dried and pressed to form an anode.

The cathode and the anode prepared as described above were each notched by a predetermined size, and stacked with a separator (polyethylene, thickness: 20 μm) interposed therebetween to form an electrode cell. Each tab portion of the cathode and the anode was welded.

The electrode assembly was inserted in a pouch, and three sides of the pouch except for an electrolyte injection side were sealed. The tab portions were also included in sealed portions. The electrolyte solution as prepared in the above (1) was injected through the electrolyte injection side, and then the electrolyte injection side was also sealed. Impregnation was performed for more than 12 hours to obtain a lithium secondary battery sample.

Example 2

A secondary battery sample was prepared by the same method as that in Example 1, except that the compound of Chemical Formula 2-1 prepared by Synthesis Example 2 was used.

Comparative Example 1

A secondary battery sample was prepared by the same method as that in Example 1, except that the fluorine-based additive was omitted in the preparation of the electrolyte solution.

Comparative Example 2

A secondary battery sample was prepared by the same method as that in Example 1, except that the compound of Chemical Formula 3 prepared by Synthesis Example 3 was used.

Experimental Example (1) Evaluation on Room Temperature Properties 1-1) Initial Capacity Evaluation After charging (4.2V, 0.05C cut-off) at 0.5C-rate CC/CV at 25° C. for each of the secondary batteries of Examples and Comparative Examples, 0.5C-rate CC discharge (2.7V cut-off) was performed, and then a discharge capacity was measured.

1-2) Internal Resistance (C_DCIR and D_DCIR) Evaluation

At an SOC 60% point, a C-rate was changed to 0.2C, 0.5C, 1.0C, 1.5C, 2.0C, 2.5C or 3.0C. When the charging and discharging of the corresponding C-rate was performed for 10 seconds, an end point of a voltage was estimated by an equation of a straight line, and a slope was adopted as a DCIR 1-3) Evaluation on Room Temperature Life-Span Property 0.5C-rate CC/CV charge (4.2V, 0.05C cut-off) and 0.5C-rate CC discharge (2.7V cut-off) were performed 1760 times at 25° C. for each of the secondary batteries of Examples and Comparative Examples, and then a discharge capacity was measured. A room temperature life-span property was evaluated by calculating the discharge capacity as a percentage relative to the initial discharge capacity.

(2) Evaluation on Low Temperature (−10° C.) Performance 2-1) Evaluation on Low Temperature Capacity Each secondary battery of Examples and Comparative Examples was 0.5C-rate CC/CV charged (4.2V 0.05C CUT-OFF) in a −10° C. chamber, and then a charge capacity was measured.

Thereafter, the battery was 0.5 C-rate CC discharged (2.7V CUT-OFF), and a discharge capacity was measured.

2-2) Evaluation on Low-Temperature Internal Resistance (C_DCIR and D_DCIR)

The batteries of Examples and Comparative Examples were left in a −10° C. chamber for 4 hours, and then low-temperature internal resistances (C_DCIR and D_DCIR) were measured by the same method as that in 1-2) above.

(3) Evaluation on High Temperature Storage Properties 3-1) Evaluation on Battery Thickness after High Temperature Storage The batteries of Examples and Comparative Examples charged as described in 1-1) were stored for 14 weeks in a constant temperature and humidity chamber at 60° C., and then a thickness of each battery was measured using a plate thickness measuring instrument (Mitutoyo, 543-490B).

3-2) Evaluation on Capacity Retention (Ret) after High Temperature Storage

The secondary batteries of Examples and Comparative Examples stored at high temperature as described above were discharged at 0.5 C-rate CC (2.7V cut-off), and a discharge capacity was measured.

A capacity retention was calculated as a percentage of the discharge capacity after the high temperature storage relative to the initial capacity measured in 1-1).

Capacity retention (%)=(discharge capacity after high temperature storage/initial capacity)×100

3-3) Evaluation on Capacity Recovery (Rec) after High Temperature Storage

After measuring the capacity retention according to 3-2) for the secondary batteries of Examples and Comparative Examples, 0.5C-rate CC/CV charging (4.2V, 0.05C cut-off) and 0.5C-rate CC discharging (2.7 V cut-off) were performed to measure a discharge capacity.

A capacity recovery was calculated as a percentage of the discharge capacity after measuring the capacity retention relative to the initial capacity measured in 1-1).

Capacity recovery (%)=(discharge capacity after measuring capacity retention/initial capacity)×100

3-4) Evaluation on Internal Resistance (DCIR) after High Temperature Storage

An internal resistance (C_DCIR and D_DCIR) of each secondary battery according to Examples and Comparative Examples stored at high temperature as described above was measured by the same method as that in 1-2).

The evaluation results are shown in Table 1 below.

TABLE 1

| secondary battery | | Example 1 | Example 2 | Comparative Example 1 | Comparative Example 2 |
|---|---|---|---|---|---|
| room temperature | capacity (mAh) | 1718 | 1706 | 1736 | 1729 |
| | C_DCIR(mΩ) | 41.7 | 39.8 | 43.2 | 41.9 |
| | D_DCIR(mΩ) | 43.1 | 43.4 | 44.4 | 44.2 |
| | life-span at room temperature | 72 | 71 | 67 | 72 |
| −10° C. performance | C_DCIR(mΩ) | 158 | 158 | 185 | 177 |
| | D_DCIR(mΩ) | 161 | 160 | 166 | 167 |
| | charge capacity (mAh) | 424 | 430 | 362 | 343 |
| | discharge capacity (mAh) | 377 | 390 | 320 | 307 |
| 60° C. 14 weeks storage | thickness (mm) | 6.21 | 5.77 | 6.46 | 6.30 |
| | C_DCIR(mΩ) | 71.7 | 100.1 | 114.3 | 117.3 |
| | D_DCIR(mΩ) | 72.6 | 95.3 | 123.5 | 127.6 |
| | Ret.(%) | 73 | 79 | 62 | 63 |
| | Rec.(%) | 74 | 79 | 64 | 64 |

Referring to Table 1, in the secondary batteries of Examples where the electrolyte solution containing the above-described fluorine-based additive was used, remarkably improved low-temperature and high-temperature properties (high capacitance properties and low internal resistance) were provided while maintaining a similar level of the initial capacity at room temperature from the secondary battery in Comparative Example 1 without the fluorine-based additive. Further, gas generation was reduced even after the high-temperature storage, and an increase of the battery thickness was suppressed.

In Comparative Example 2, a linear alkyl group-bonded additive was used to provide explicitly lower capacity properties than those of Examples, and the capacity at room temperature was reduced compared to that of Comparative Example 1.

What is claimed is:

1. An electrolyte solution for a lithium secondary battery, comprising:
an organic solvent;
a lithium salt; and
a fluorine-based additive in which a terminal difluorophosphite group (—$OPF_2$) is bonded to a branched saturated hydrocarbon group,
wherein the fluorine-based additive comprises a compound represented by Chemical Formula 2 below:

[Chemical Formula 2]

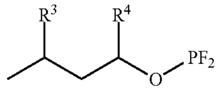

wherein, in Chemical Formula 2, $R^3$ and $R^4$ are each independently a C1-C10 alkyl group.

2. The electrolyte solution for a lithium secondary battery according to claim 1, wherein $R^3$ and $R^4$ are each independently a C1-C3 alkyl group.

3. The electrolyte solution for a lithium secondary battery according to claim 1, wherein the fluorine-based additive comprises a compound represented by Chemical Formula 2-1:

[Chemical Formula 2-1]

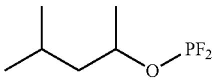

4. The electrolyte solution for a lithium secondary battery according to claim 1, wherein the fluorine-based additive is included in an amount ranging from 0.1 wt % to 5.0 wt % based on a total weight of the electrolyte solution.

5. The electrolyte solution for a lithium secondary battery according to claim 1, wherein the fluorine-based additive is included in an amount ranging from 0.5 wt % to 2.0 wt % based on a total weight of the electrolyte solution.

6. The electrolyte solution for a lithium secondary battery according to claim 1, further comprising at least one auxiliary additive selected from the group consisting of a cyclic carbonate-based compound, a fluorine-substituted cyclic carbonate-based compounds, a sultone-based compound and a cyclic sulfate-based compound.

7. The electrolyte solution for a lithium secondary battery according to claim 6, wherein the auxiliary additive is included in an amount ranging from 0.01 wt % to 5 wt % based on a total weight of the electrolyte solution.

8. The electrolyte for a lithium secondary battery according to claim 1, wherein the organic solvent includes at least one selected from the group consisting of ethylene carbonate (EC), ethyl methyl carbonate (EMC), dimethyl carbonate (DMC) and diethyl carbonate (DEC).

9. A lithium secondary battery, comprising:
an electrode assembly comprising a plurality of cathodes and anodes that are repeatedly stacked;
a case accommodating the electrode assembly; and
the electrolyte solution for a lithium secondary battery of claim 1 accommodated in the case together with the electrode assembly.

* * * * *